United States Patent
Tsuruta

(10) Patent No.: US 10,527,737 B2
(45) Date of Patent: Jan. 7, 2020

(54) DOSE CALCULATION DEVICE, DOSE CALCULATION METHOD, AND MEASUREMENT DEVICE WITH DOSE CALCULATION FUNCTION

(71) Applicants: KABUSHIKI KAISHA TOSHIBA, Minato-ku (JP); Toshiba Energy Systems & Solutions Corporation, Kawasaki-shi (JP)

(72) Inventor: Satoru Tsuruta, Hachioji (JP)

(73) Assignees: KABUSHIKI KAISHA TOSHIBA, Minato-ku (JP); Toshiba Energy Systems & Solutions Corporation, Kawasaki-shi (JP)

(*) Notice: Subject to any disclaimer, the term of this patent is extended or adjusted under 35 U.S.C. 154(b) by 60 days.

(21) Appl. No.: 15/780,683

(22) PCT Filed: Nov. 30, 2016

(86) PCT No.: PCT/JP2016/085546
§ 371 (c)(1),
(2) Date: Jun. 1, 2018

(87) PCT Pub. No.: WO2017/094773
PCT Pub. Date: Jun. 8, 2017

(65) Prior Publication Data
US 2018/0356535 A1    Dec. 13, 2018

(30) Foreign Application Priority Data
Dec. 1, 2015    (JP) .................................. 2015-234894

(51) Int. Cl.
*G01T 1/02*    (2006.01)
*G01F 23/00*    (2006.01)

(52) U.S. Cl.
CPC ................ *G01T 1/02* (2013.01); *G01F 23/00* (2013.01)

(58) Field of Classification Search
CPC .................................. G01T 1/20; G01F 23/00
(Continued)

(56) References Cited

U.S. PATENT DOCUMENTS 5,469,749 A    11/1995    Shimada et al.
2006/0189863 A1*    8/2006    Peyser ................. A61B 5/0031
                                                    600/345

FOREIGN PATENT DOCUMENTS

JP    59-191622 A    10/1984
JP    4-32207 A    2/1992
(Continued)

OTHER PUBLICATIONS

English Translation of JP 2011-137770 (Year: 2011).*
(Continued)

*Primary Examiner* — David P Porta
*Assistant Examiner* — Abra S Fein
(74) *Attorney, Agent, or Firm* — Oblon, McClelland, Maier & Neustadt, L.L.P.

(57) ABSTRACT

A dose calculation device 50 includes: a detector 20 detecting a physical quantity as voltage; a V/I conversion element 28 converting the quantity into current; a memory 51 storing a zero point current and a shift amount from a true value caused by radiation; a correlation storage 52 storing zero point shift data in correlation between the zero point current and cumulative dose and span shift data in correlation between the cumulative dose and the shift; a first evaluator 53 estimating cumulative dose of the V/I conversion element 28 based on the zero point current and the zero point shift; a second evaluator 54 estimating cumulative dose of the V/I conversion element 28 based on the shift and the span shift;
(Continued)

and a comparator 56 specifying a common cumulative dose as a true cumulative dose by comparing cumulative doses estimated by the first evaluator 53 and the second evaluator 54.

11 Claims, 10 Drawing Sheets

(58) Field of Classification Search
USPC ........................................................ 250/395
See application file for complete search history.

(56) References Cited

FOREIGN PATENT DOCUMENTS

| | | |
|---|---|---|
| JP | 5-223678 A | 8/1993 |
| JP | 7-12941 A | 1/1995 |
| JP | 7-54394 A | 2/1995 |
| JP | 2000-337945 A | 12/2000 |
| JP | 2010-219226 A | 9/2010 |
| JP | 2010-267835 A | 11/2010 |
| JP | 2011137770 A * | 7/2011 |
| JP | 2013-104757 A | 5/2013 |
| JP | 2016-38316 A | 3/2016 |

OTHER PUBLICATIONS

International Search Report dated Feb. 21, 2017 in PCT/JP2016/085546 filed Nov. 30, 2016.

"Nasda News", Dec. 1998, vol. 205, 8 total pages (with English translation).

"JAXA Design Standard, Space Environment Effects Mitigation", Japan Aerospace Exploration Agency, Sep. 3, 2008, JERG-2-143, 54 total pages.

* cited by examiner

ZERO POINT SHIFT DATA

SPAN SHIFT DATA

DOSE CALCULATION DEVICE, DOSE CALCULATION METHOD, AND MEASUREMENT DEVICE WITH DOSE CALCULATION FUNCTION

FIELD

Embodiments of the present invention relate to a dose calculation technique at a detection point with the use of a detection device configured to detect a specific physical quantity.

BACKGROUND

In a facility where radiation dose is above a reference value and it is difficult to enter the inside, the acquisition of the information inside the facility is sometimes required.

The required information is, e.g., information on physical quantities such as pressure and temperature in the facility or the level of liquid accumulated in the facility.

The physical quantities to be detected are often detected in the form of voltage with the use of a detector.

The transmission mode of the detected voltage is roughly divided into a mode of transmitting the voltage without any conversion and a mode of transmitting the current converted from the voltage by V/I conversion.

The mode of transmitting information in the form of current has a feature that the influence of noise is smaller than the mode of transmitting information as voltage when the transmission distance is long.

In a measuring device that detects and measures such a physical quantity, an indication value to be displayed sometimes deviates from the true value due to, e.g., change in the elasticity of springs inside the measuring device, which is caused by long-term use.

For this reason, in general, the calibration of the indicated value is performed at a specific time, such as at the time of the installation of the detector or every predetermined period after the installation.

Two types of calibration, i.e., the zero point calibration and the span calibration are often performed.

The zero point calibration is such a calibration that the indicated value is caused to become zero when the voltage input into a V/I conversion element is zero.

Hereinafter, the term "zero point current" is used for the amount of an electric current that is outputted from the V/I conversion element when the voltage inputted into the V/I conversion element is zero.

The span calibration is such a calibration that the indicated value is caused to indicate the true value of the physical quantity at each input voltage when plural known voltages are inputted to the V/I conversion element.

Hereinafter, the term "span shift amount" is used for the amount of the deviation of the electric current value outputted by the V/I conversion element from the true value with respect to the inputted known voltage.

PRIOR ART DOCUMENT

Patent Document

[Patent Document 1] Japanese Unexamined Patent Application Publication No. H07-054394
[Patent Document 2] Japanese Unexamined Patent Application Publication No. 2000-337945
[Patent Document 3] Japanese Unexamined Utility Model Application Publication No. H03-2821

SUMMARY OF THE INVENTION

Problem to be Solved by the Invention

Since it is difficult to frequently exchange and repair a detection device installed in a place where access is difficult, such a detection device is required to acquire as much information as possible with one unit in addition to having a simple structure and high durability.

In particular, a detection device installed in a radioactively contaminated facility has a high demand for the acquisition of radiation dose.

By acquiring radiation dose information, it is possible not only to grasp the radiation dose in the facility but also to grasp the replacement timing of the detection device on the basis of the exposure dose.

In view of the above-described problem, an object of the present invention is to provide a dose calculation device, a dose calculation method, and a measurement device with a dose calculation function, each of which can calculate radiation dose at a detection point without adding a new device to a detector that detects a specific physical quantity.

Means for Solving Problem

A dose calculation device according to the present embodiment is equipped in a measurement device that converts a detected physical quantity from voltage into current by a V/I conversion element and transmits the detected physical quantity, and includes a memory, a correlation storage, a first evaluator, a second evaluator, and a comparator. The memory stores a zero point current outputted from the V/I conversion element by being exposed to radiation in a period during which the voltage is not inputted, and also stores a shift amount from a true value of an electric current that is outputted from the V/I conversion element by being exposed to radiation with respect to an inputted known voltage. The correlation storage holds zero point shift data indicating correlation between the zero point current and the cumulative radiation dose of the radiation acquired in advance, and also holds span shift data indicating correlation between the cumulative radiation dose and the shift amount. The first evaluator estimates at least one cumulative radiation dose of the V/I conversion element on the basis of the zero point current stored in the memory and the zero point shift data. The second evaluator estimates at least one cumulative radiation dose of the V/I conversion element on the basis of the shift amount stored in the memory and the span shift data. The comparator specifies a common cumulative radiation dose as a true cumulative radiation dose, by comparing the respective cumulative radiation doses estimated by the first evaluator and the second evaluator.

A measurement device with a dose calculation function according to the present embodiment includes a detector, a V/I conversion element, a memory, a correlation storage, a first evaluator, a second evaluator, and a comparator. The detector detects a specific physical quantity as voltage. The V/I conversion element converts the physical quantity from voltage into current. The memory stores a zero point current outputted from the V/I conversion element by being exposed to radiation in a period during which the voltage is not inputted, and also stores a shift amount from a true value of an electric current that is outputted from the V/I conversion element by being exposed to radiation with respect to an inputted known voltage. The correlation storage holds zero point shift data indicating correlation between the zero point current and the cumulative radiation dose of the radiation acquired in advance, and also holds span shift data indicating correlation between the cumulative radiation dose and the shift amount. The first evaluator estimates at least one cumulative radiation dose of the V/I conversion element on the basis of the zero point current stored in the memory and the zero point shift data. The second evaluator estimates at least one cumulative radiation dose of the V/I conversion element on the basis of the shift amount stored in the memory and the span shift data. The comparator specifies a common cumulative radiation dose as a true cumulative radiation dose, by comparing the respective cumulative radiation doses estimated by the first evaluator and the second evaluator.

A dose calculation method according to the present embodiment is a method in which a measurement device is used for converting a detected physical quantity from voltage into current by a V/I conversion element and transmitting the detected physical quantity, and includes steps of: acquiring a zero point current and a shift amount from a true value of an electric current, the zero point current being outputted from the V/I conversion element by being exposed to radiation in a period during which voltage is not inputted, the electric current being outputted from the V/I conversion element by being exposed to radiation with respect to an inputted known voltage; referring to zero point shift data and span shift data, the zero point shift data indicating correlation between the zero point current and the cumulative radiation dose of the radiation acquired in advance, the span shift data indicating correlation between the cumulative radiation dose and the shift amount; estimating at least one cumulative radiation dose of the V/I conversion element based on the zero point current and the zero point shift data as a first estimation step; estimating at least one cumulative radiation dose of the V/I conversion element based on the shift amount and the span shift data as a second estimation step; and determining a common cumulative radiation dose as a true cumulative radiation dose by comparing the respective cumulative radiation doses estimated in the first and second estimation steps.

DESCRIPTION OF EMBODIMENTS

Hereinafter, embodiments of the present invention will be described with reference to the accompanying drawings.

[Measurement Device 10]

First, a description will be given of a measurement apparatus 10 to which a dose calculation device 50 (hereinafter, simply referred to as the calculation device 50) is applied, with reference to FIG. 1 and FIG. 2.

Figure 1:
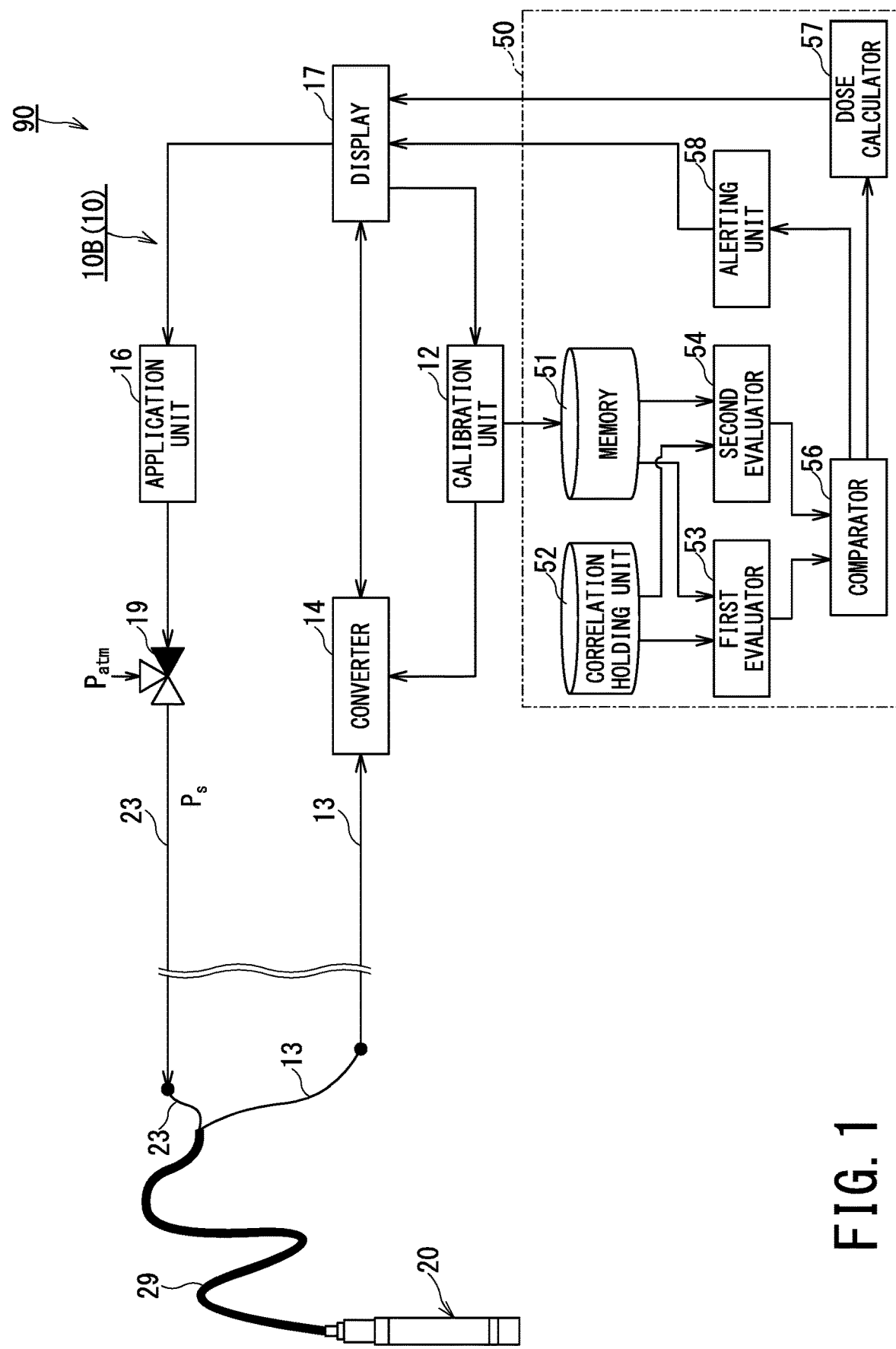
FIG. 1 is a schematic configuration diagram of a dose calculation device according to the first embodiment and a measurement device to which this dose calculation device is applied.

FIG. 1 is a schematic configuration diagram of the calculation device 50 according to the first embodiment and the measurement device 10 to which this calculation device 50 is applied.

The measurement device 10 to which the calculation device 50 is applied is installed in a facility where its detector 20 is contaminated with radiation.

The measurement device 10 converts a physical quantity detected by the detector 20 in the form of voltage into current, and transmits the physical quantity in the form of current to a remote place.

The measurement device 10 is, e.g., an immersion-type water gauge 10A that the measures water level of coolant discharged and accumulated in a nuclear power plant at the time of a natural disaster.

In the following embodiments, the immersion-type water gauge 10A will be described as an example of the measurement device 10.

However, the immersion-type water gauge 10A is not limited to the example of the immersion-type water gauge 10A but the immersion-type water gauge 10A may be any device that converts detected information into current so as to transmits it and is provided at a place where the acquisition of radiation dose is required.

As shown in FIG. 1, the immersion-type water gauge 10A has the detector 20 that is connected to a converter 14 via a signal line 13 and is thrown into liquid.

The converter 14 is connected to a display 17 in a central control room, for instance.

The converter 14 converts the electric current related to the liquid level of the liquid received from the detector 20, and transmits it to the display 17.

Figure 2:
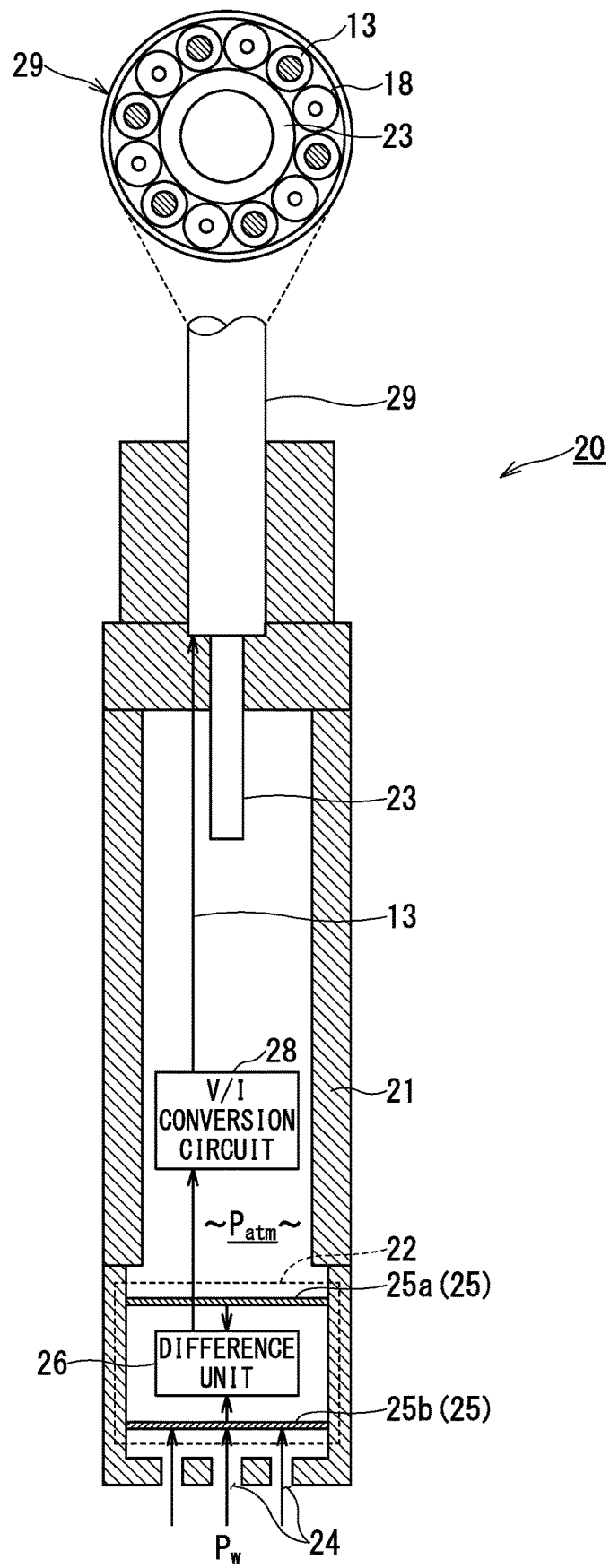
FIG. 2 is a schematic cross-sectional view of a detector included in a measurement device (immersion-type water gauge).

FIG. 2 is a schematic sectional view of the detector 20 included in the immersion-type water gauge 10A.

As shown in FIG. 2, the detector 20 has a cylindrical outer shape by a housing 21 that is provided with water inlet holes 24 on one bottom surface.

Inside the housing 21, a pressure sensor 22 is installed in the vicinity of the bottom surface, where the water inlet holes 24 are provided, so as to seal the housing 21.

The inside of the housing 21 is isolated from the surrounding liquid by the pressure sensor 22, and no liquid intrudes further from the pressure sensor 22.

A hollow cable 23 is connected to the other bottom surface on which the water inlet holes 24 are not provided.

The hollow cable 23 is covered together with a signal line 13 and a reinforcing line 18 to constitute a transmission line 29, and is laid over the water.

Normally, the hollow cable 23 is open to the atmosphere at an opening on the water, and the inside of the housing 21 is maintained at the atmospheric pressure $P_{atm}$.

That is, one surface facing the inside of the housing 21 receives the atmospheric pressure $P_{atm}$.

The other side of the pressure sensor 22 that comes into contact with the liquid receives the water pressure $P_w$.

For instance of, a diaphragm 25 is widely used as the pressure sensor 22, which converts the pressure applied to the barrier membrane into the magnitude of an electric signal.

The diaphragm is an elastic barrier membrane, and the degree of the expansion and the recession of the diaphragm by pressure can be read.

Methods of electrically reading this degree include a capacitive type of sensing a displacement and a semiconductor strain gauge type that detects distortion by a piezoelectric element installed in the diaphragm 25.

The pressure difference $\Delta P$ (FIG. 10) between the water pressure $P_w$ received by the water-pressure-side diaphragm 25b of the pressure sensor 22 and the atmospheric pressure $P_{atm}$ received by the reference-pressure-side diaphragm 25a via the hollow cable 23 is converted into voltage and supplied to the difference unit 26.

Instead of using the diaphragm 25, a device that measures water pressure using a non-illustrated spring also operates as the detector 20 in a similar manner.

The voltage being read is converted into current by the V/I conversion element 28, and is outputted to the signal line 13 to which the converter 14 is connected, as shown in FIG. 1.

An electric signal based on the pressure difference $\Delta P$ transmitted from the V/I conversion element 28 is converted into voltage by the converter 14 and displayed as the liquid level on the display 17.

However, the indicated value of the water level is calculated on the basis of on pressure such as the water pressure $P_w$ as described above, and thus it deviates from the actual water level in some cases.

Accordingly, by applying a known pressure to the reference-pressure-side diaphragm 25a (25) at a predetermined time, calibration such as the zero point calibration or the span calibration of the indicated value is performed.

The applied pressure is controlled, for instance, according to a worker's instruction transmitted from the display 17 to an application unit 16.

The application unit 16 is connected to the hollow cable 23 via a three-way valve 19.

First Embodiment

Continuing with FIG. 1, the calculation device 50 will be described.

As shown in FIG. 1, the calculation device 50 according to the first embodiment includes a memory 51, a correlation storage 52, a first evaluator 53, a second evaluator 54, a comparator 56, a calculator (i.e., dose calculator 57 in FIG. 1), and a alerting unit 58.

The memory 51 stores and accumulates the zero point current and the span shift amount (hereinafter, the zero point current and the span shift amount are collectively referred to as "shift amount").

When radioactive rays are radiated onto the V/I conversion element 28 that is semiconductor, the electric current outputted from the V/I conversion element 28 changes irreversibly and becomes the shift amount.

When the mechanical strength of the display mechanism displaying the physical quantity is sufficient in the measurement device 10, the shift component caused by the deterioration of the display mechanism is negligible out of the entire shift amount.

When other components that generate the shift amount can be ignored or removed as described above, it can be said that the occurrence of the shift amount is caused by the radiation irradiation.

For this reason, the memory 51 stores and accumulates the shift amount checked at the time of the zero point calibration or the span calibration to be performed at monthly intervals, for instance.

The correlation storage 52 holds the previously acquired zero point shift data and span shift data.

The zero point shift data are the data indicative of correlation between the cumulative radiation dose of radioactive rays and the zero point current.

The span shift data are the data indicative of the correlation between the accumulated irradiation amount of radioactive rays and the span shift amount.

Figure 3A:
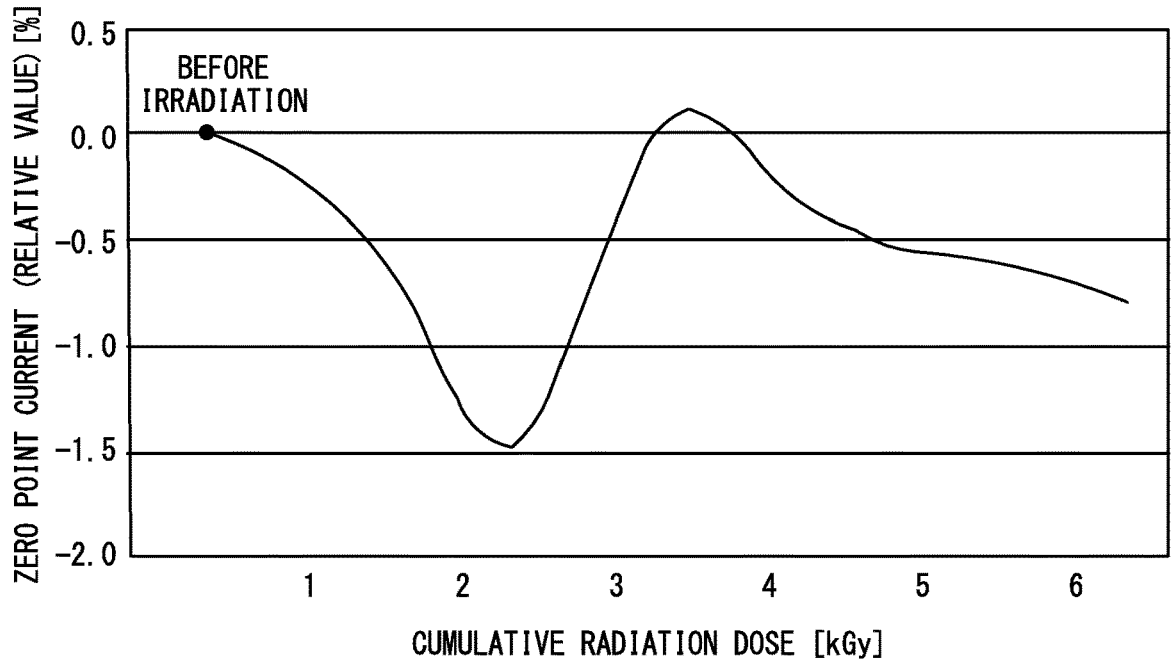
FIG. 3A is a diagram illustrating zero point shift data.
Figure 3B:
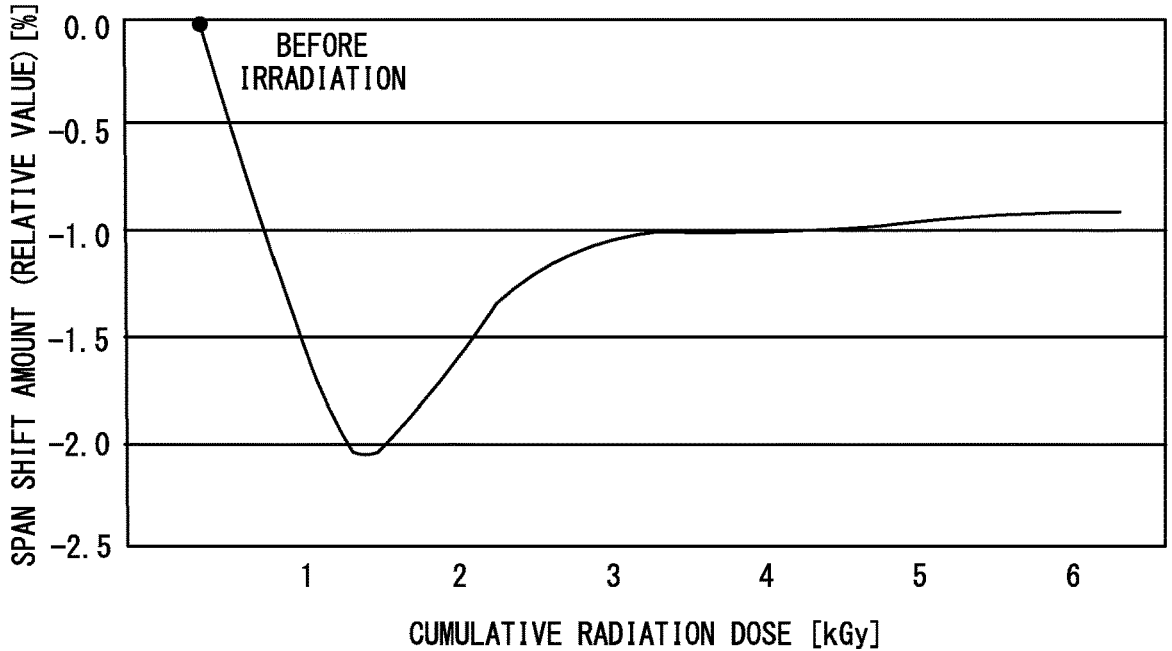
FIG. 3B is a diagram illustrating span shift data.

FIG. 3A is a diagram illustrating the zero point shift data, and FIG. 3B is a diagram illustrating the span shift data.

In each of FIG. 3A and FIG. 3B, the horizontal axis represents the accumulated radiation dose (kGy).

The vertical axis of FIG. 3A represents the zero point current, and the vertical axis of FIG. 3B represents the span shift amount.

As characteristics of the semiconductor used for the V/I conversion element 28, the shift amount changes without being proportional to the accumulated radiation amount in each of FIG. 3A and FIG. 3B.

For instance, the absolute value (relative value) of the zero point current increases with the cumulative radiation dose up to about 2 kGy, but decreases and approaches zero when it exceeds about 2 kGy.

After that, the absolute value of the zero point current changes with some extreme values for each region.

The correlation storage 52 holds the zero point shift data and the span shift data, both of which are obtained in advance by performing measurement experiment or the like on semiconductor being similar to the actually used semiconductor.

The zero point shift data and the span shift data may be numerical data instead of graph data.

Each of the first evaluator 53 and the second evaluator 54 is connected to the memory 51 and the correlation storage 52.

Figure 4:
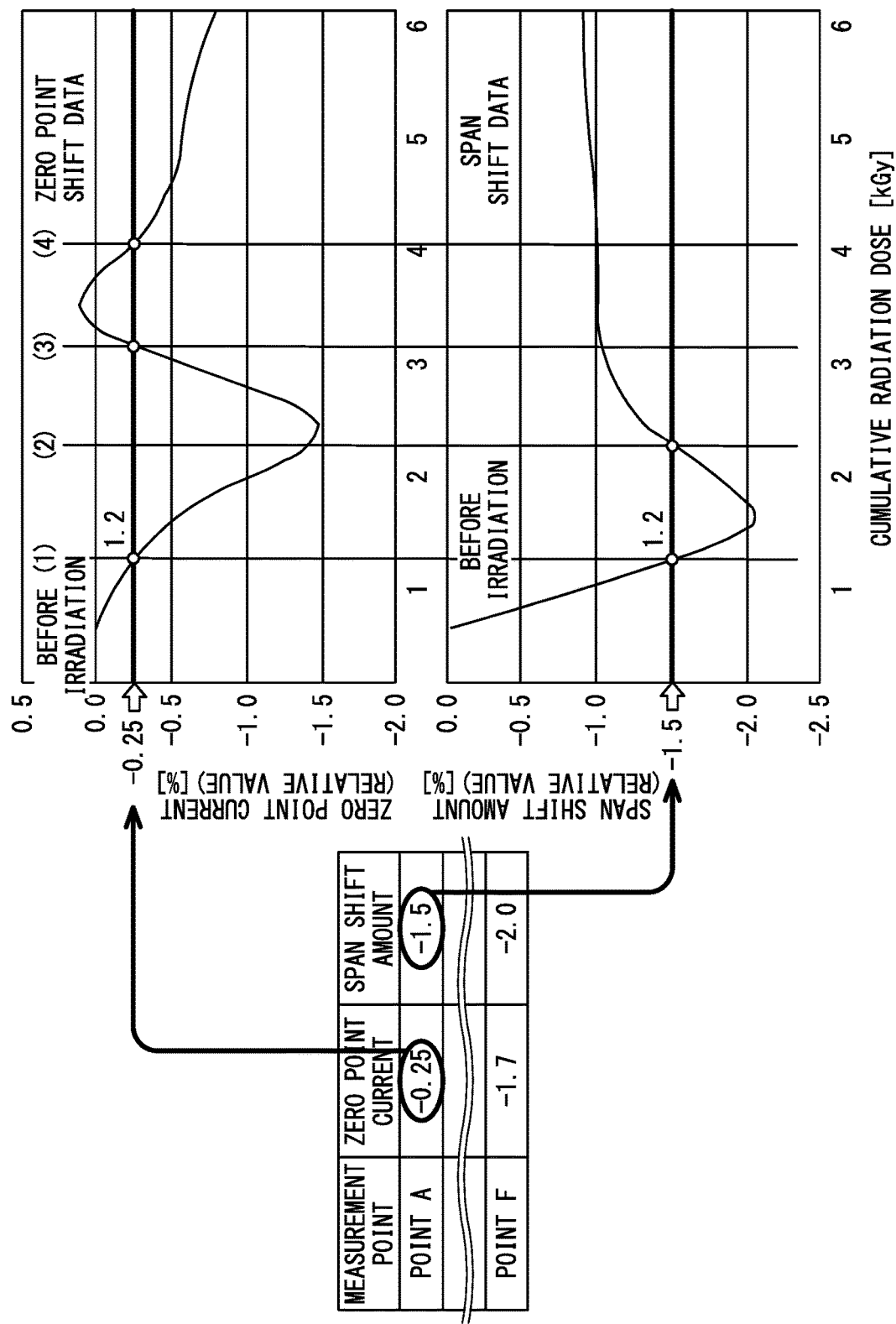
FIG. 4 is a schematic diagram illustrating a calculation method of cumulative radiation dose based on a zero point current and a span shift amount.

FIG. 4 is a schematic diagram illustrating a calculation method of the cumulative radiation dose based on the shift amount.

The first evaluator 53 estimates at least one cumulative radiation dose of the V/I conversion element 28 on the basis of the zero point current and the zero point shift data.

For instance, as shown in FIG. 4, the zero point current detected by the one installed at the point A among the plural detectors 20 installed at respective detection points is assumed to be −0.25(%).

In this case, the cumulative radiation dose of the detector 20 at the point A is estimated to be the value of (1), (3), or (4), each of which is the intersection point between the zero point shift data and the straight line having the value of −0.25 in the vertical axis in FIG. 4.

In this manner, the first evaluator 53 estimates the integrated irradiation dose as the value of (1), (3) or (4).

The second evaluator 54 estimates at least one cumulative radiation dose of the V/I conversion element 28 on the basis of the span shift amount and the span shift data.

For instance, it is assumed that the amount of span shift measured by the detector 20 installed at the point A is −1.5(%).

The second evaluator 54 estimates the value of (1) or (2), each of which is the intersection point between the span shift data and the straight line having the value of −1.5 in the vertical axis, as the cumulative radiation dose in a manner similar to the first evaluator 53.

The comparator 56 compares the cumulative radiation dose estimated by the first evaluator 53 with the cumulative radiation dose estimated by the second evaluator 54, and specifies the common cumulative radiation dose as the true cumulative radiation dose.

In the case of FIG. 4, since only (1) among the estimated values of (1) to (4) is the common estimated value, the comparator 56 specifies the estimated value of (1) as the true cumulative radiation dose.

The specified true cumulative radiation dose is transmitted to the calculator 57.

The calculator 57 calculates the radiation dose by dividing the true cumulative radiation dose by the period from the detection start of the detector 20.

In the case of FIG. 4, the true cumulative radiation dose is 1.2 kGy.

Accordingly, assuming that the period from the start of detection is three months, the radiation dose per unit time is calculated by the following equation M.

$$1.2 \text{ kGy}/(3 \text{ months} \times 30 \text{ days} \times 24 \text{ hours}) = 0.55 \text{ Gy/h} \quad (M)$$

The calculated radiation dose per unit time is displayed on the display 17 and checked by the operator.

The alerting unit 58 is connected to the comparator 56 and the display 17.

The alerting unit 58 issues an alert when the cumulative radiation dose specified by the calculator 57 is larger than a predetermined threshold value.

The measurement device 10 deteriorates by being subjected to irradiation of radioactive rays for a long term, and becomes unable to accurately detect the water level.

For this reason, a threshold value is set for the cumulative radiation dose, and an alert is displayed as a replacement time on the display 17 when the cumulative radiation dose becomes equal to or more than this threshold value.

Note that plural threshold values may be set and alerts may be changed in accordance with the stage of the cumulative radiation dose.

Figure 5:
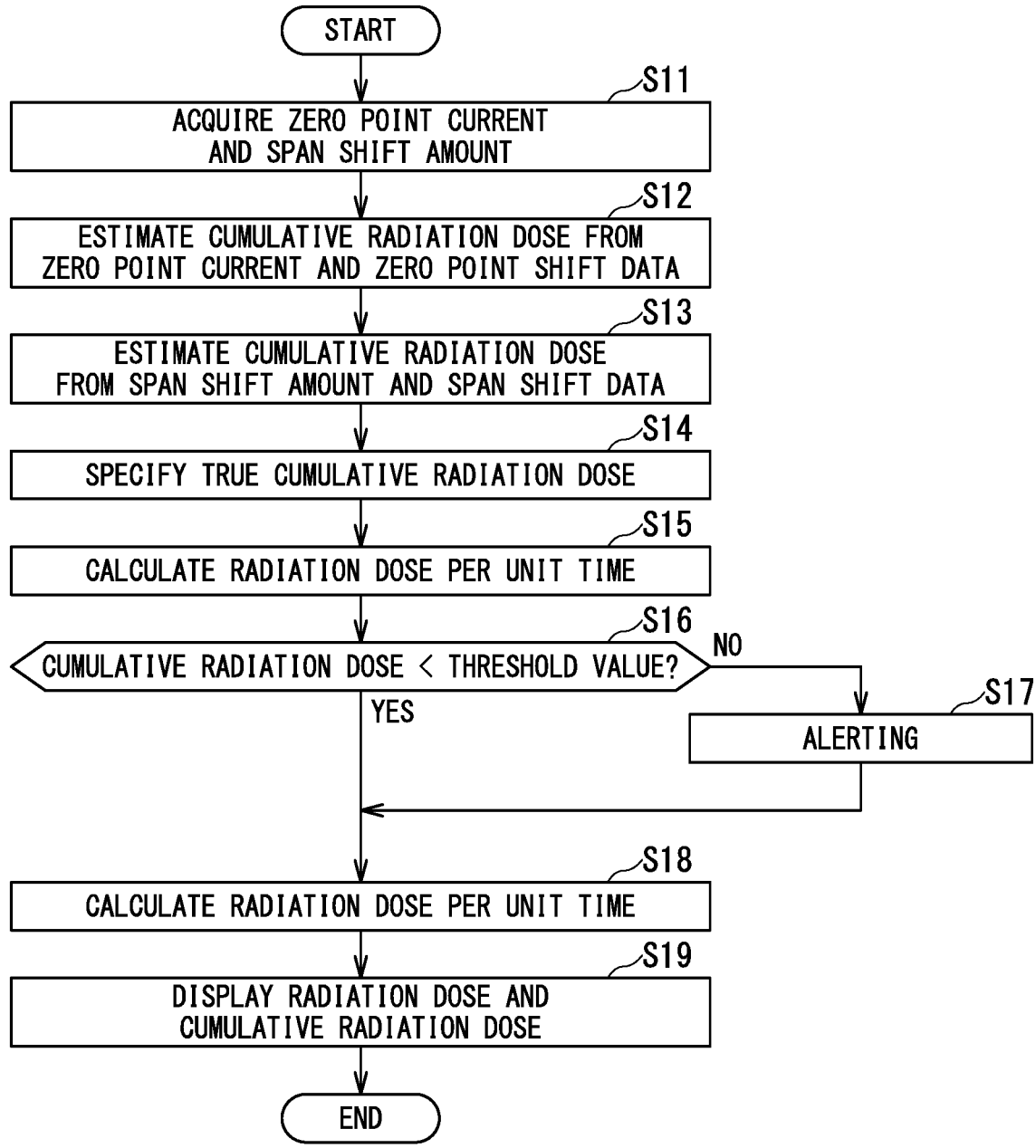
FIG. 5 is a flowchart illustrating the dose calculation method according to the first embodiment.

Next, the dose calculation method according to the first embodiment will be described on the basis of the flowchart of FIG. 5 by referring to FIG. 1 and FIG. 4 as required.

In the first step S11, at the time of the zero point calibration, the span calibration, or the like, the memory 51 acquires the checked zero point current and span shift amount, and then each of the first evaluator 53 and the second evaluator 54 refers to the memory 51 and the correlation storage 52.

In the first estimation step S12, the first evaluator 53 estimates at least one cumulative radiation dose of the V/I conversion element 28 on the basis of the zero point current and the zero point shift data. The first evaluator 53 estimates the values of (1), (3) and (4) as cumulative radiation doses in the case of FIG. 4.

In the second estimation step S13, the second evaluator 54 estimates at least one cumulative radiation dose of the V/I conversion element 28 on the basis of the stored span shift amount and span shift data. The second evaluator 54 estimates the values of (1) and (2) as cumulative radiation doses in the case of FIG. 4.

In the step S14, the comparator 56 compares the cumulative radiation doses estimated by the first evaluator 53 with the cumulative radiation doses estimated by the second evaluator 54, and determines the common cumulative radiation dose (1) as the true cumulative radiation dose.

In the step S15, the calculator 57 calculates the radiation dose per unit time from the true cumulative radiation dose as in the equation M. The calculated radiation dose per unit time is displayed on the display 17 and checked by an operator.

When it is determined in the step S16 that the cumulative radiation dose specified by the calculator 57 is larger than the predetermined threshold value, the alerting unit 58 displays an alert on the display 17 in the step S17.

Thereafter, the calculator 57 calculates the radiation dose per unit time in the step S18, and the calculated radiation dose per unit time is displayed on the display 17 together with the cumulative radiation dose in the step S19.

When it is determined in the step S16 that the cumulative radiation dose specified by the calculator 57 is equal to or smaller than the predetermined threshold value, the radiation dose per unit time and the true cumulative radiation dose are displayed on the display 17 without outputting a alerting unit 58 in the steps S18 and S19.

As described above, according to the calculation device 50 and the dose calculation method of the first embodiment, it is possible to determine the radiation dose at the detection point without adding a new device to the detector 20 that detects a specific physical quantity.

It should be noted that the calculation device 50 may be integrated with the measurement device 10 to form one measurement device 90 with a dose calculation function as a whole.

For instance, plural detectors 20 or plural measurement device 10 may be connected to one calculation device 50 so as to be installed at different installation points.

By causing the plural detectors 20 or the plural measurement devices 10 to share the calculation device 50, the monitoring of plural detection points and the management of the measurement devices 10 can be concentrated in one place.

Second Embodiment

Figure 6:
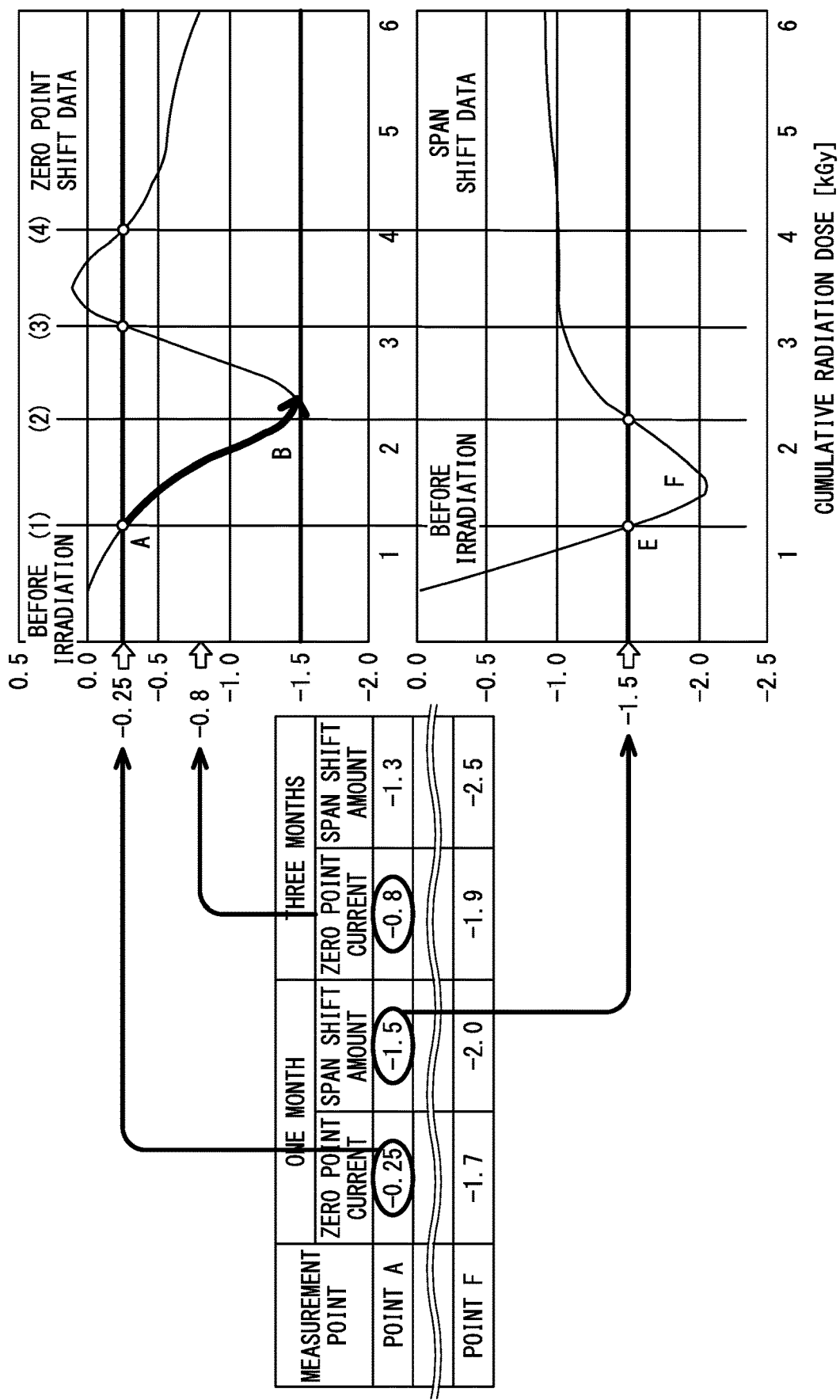
FIG. 6 is a schematic diagram illustrating the dose calculation method according to the second embodiment.

FIG. 6 is a schematic diagram illustrating the dose calculation method according to the second embodiment.

As shown in FIG. 6, the first evaluator 53 of the calculation device 50 according to the second embodiment limits the reference range of the zero point shift data by two or more zero point currents having different recording times.

Since the zero point shift data are often the result of the measurement experiment, the zero point shift data may have many extreme values.

Thus, a large number of cumulative radiation doses are estimated for one zero point current, and so the true integrated irradiation dose cannot be specified to be one even when it is combined with the span shift amount.

Accordingly, for instance, the section is limited to [A, B] by using respective two zero point currents that are one month and three months after the start of detection as shown in FIG. 6.

By this limitation, (3) and (4) are excluded from the candidates of the cumulative radiation dose.

In a manner similar to the first embodiment, the cumulative radiation dose common to the cumulative radiation dose estimated by the second evaluator 54 is treated as the true cumulative radiation dose.

Figure 7:
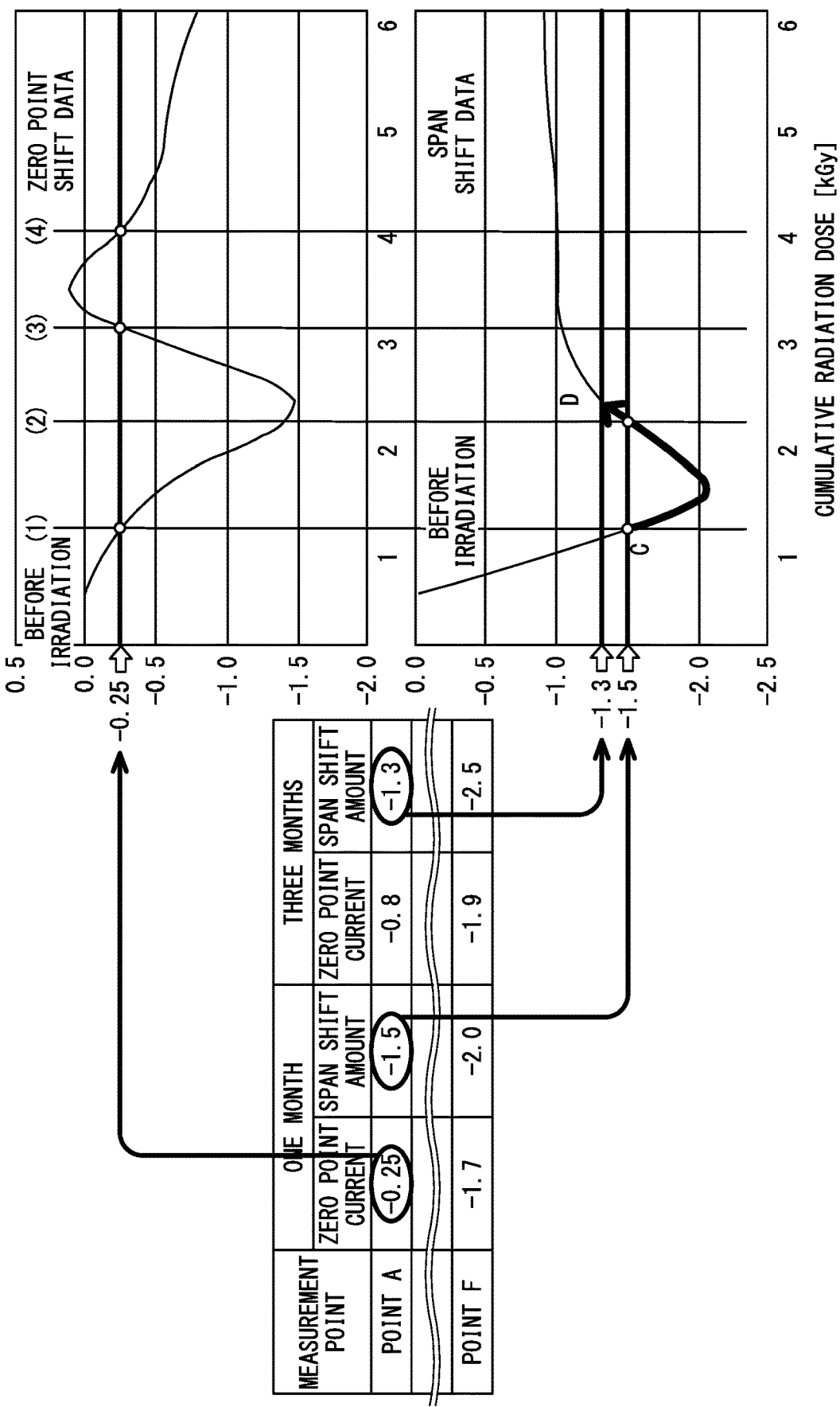
FIG. 7 is a schematic diagram illustrating a dose calculation method according to a modification of the second embodiment.

FIG. 7 is a schematic diagram illustrating a dose calculation method according to a modification of the second embodiment.

The limitation of the section based on the above-described two or more recording times may be performed on the span shift data in the second evaluator 54 as shown in FIG. 7.

In other words, it is also possible to limit the reference range of the span shift data by two or more span shift amounts having different recording times.

Since the second embodiment is the same as the first embodiment in terms of configuration and operation except that the reference range of the first evaluator 53 or the second evaluator 54 is limited, duplicate description is omitted.

The same reference signs are given for equivalent components in terms of configuration or function in each figure, and duplicate description is omitted.

As described above, the dose calculation method according to the second embodiment can obtain the same effect as the first embodiment and can specify the true cumulative radiation dose by limiting the reference range by two or more shift amounts having different recording times.

Third Embodiment

Figure 8:
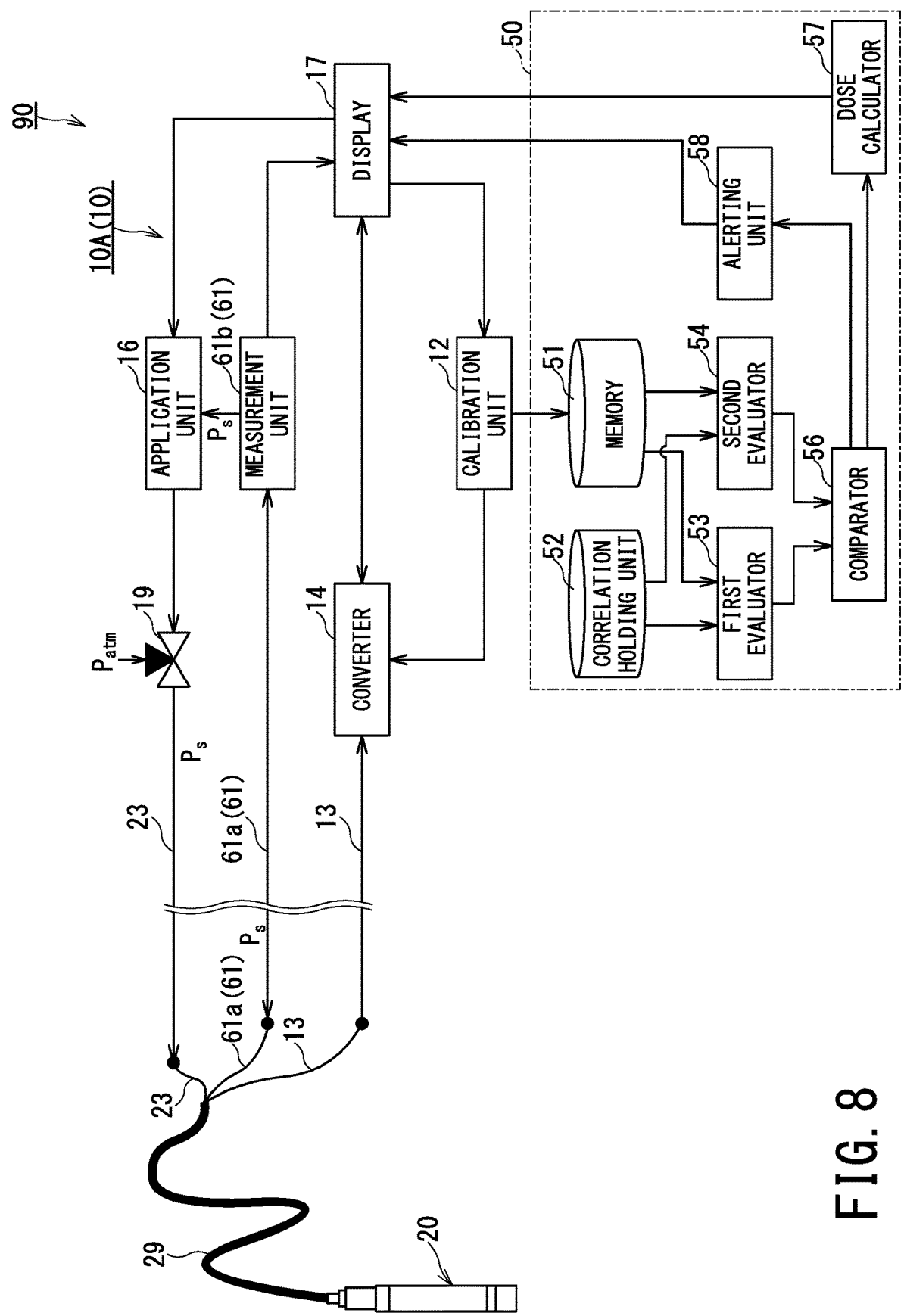
FIG. 8 is a schematic configuration diagram of a measurement device with a dose calculation function according to the third embodiment.

FIG. 8 is a schematic configuration diagram of a measurement device 90 with a dose calculation function according to the third embodiment.

Figure 9:
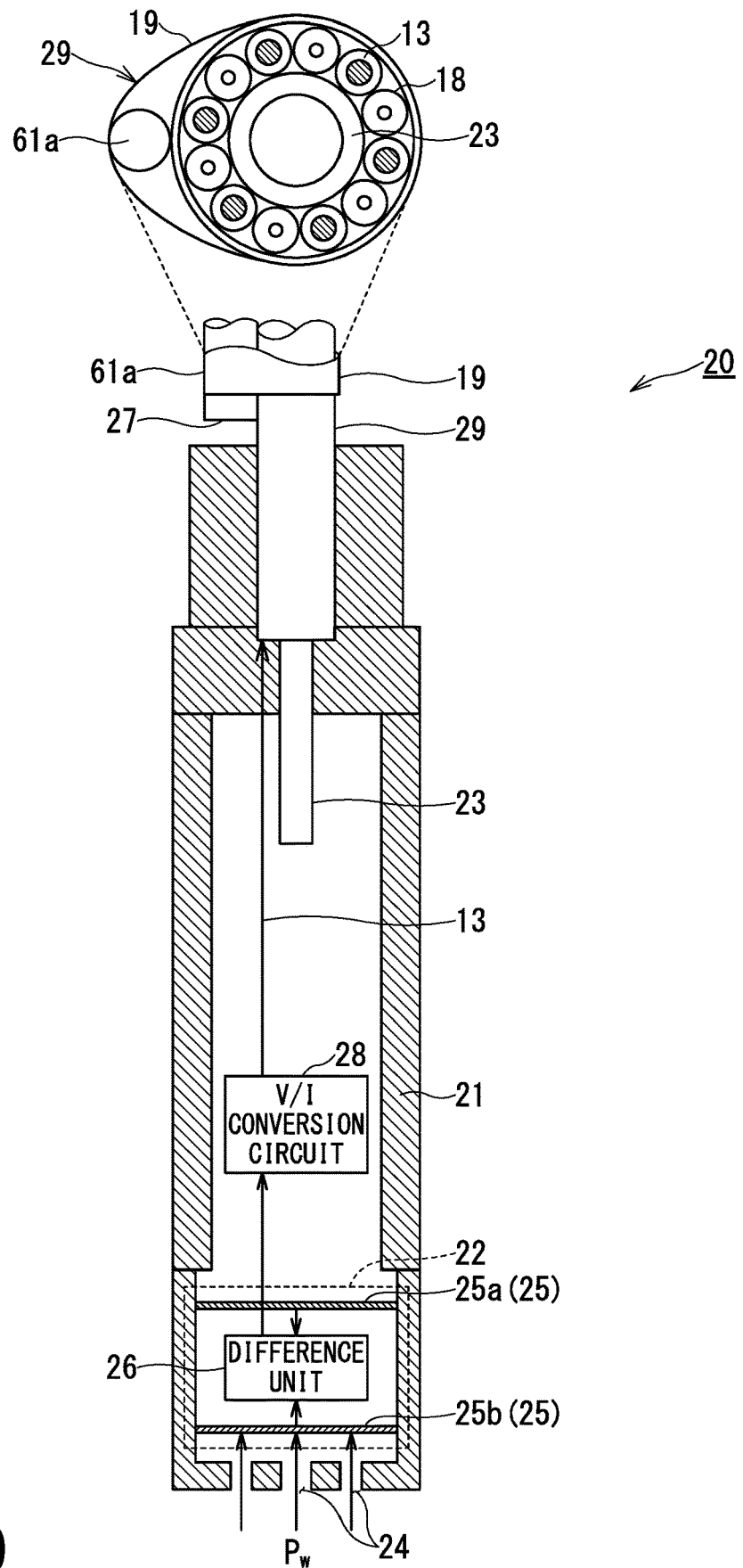
FIG. 9 is a schematic diagram illustrating a detector provided with a immersed section of an auxiliary measurement unit included in a measurement device with a dose calculation function according to the third embodiment.

FIG. 9 is a diagram illustrating a detector 20 that is provided with a immersed section 61a (bubbler tube 61a) of the auxiliary measurement unit 61 included in the measurement device 90 with a dose calculation function according to the third embodiment.

As shown in FIG. 8 and FIG. 9, the calculation device 50 according to the third embodiment includes the auxiliary measurement unit 61 that is fixed to the outer surface of the detector 20 and measures the water pressure $P_w$ applied to the detector 20.

The auxiliary measurement unit 61 includes, e.g., the bubbler tube 61a and a measurement unit 61b. The bubbler tube 61a has an open end 27 fixed to the outer surface of the detector 20, and the measurement unit 61b applies the back pressure $P_s$ to the bubbler tube 61a for measuring this back pressure $P_s$.

The measurement unit 61b applies the back pressure $P_s$ until bubbles come out from the open end 27 of the bubbler tube 61a, and measures the back pressure $P_s$ at the limit where bubbles come out from the open end 27.

The measured back pressure Ps is transmitted to the application unit 16 and applied to the reference-pressure-side diaphragm 25a via the hollow cable 23.

Since the open end 27 is fixed to the outer surface of the detector 20, the limit back pressure $P_s$ applied by the measurement unit 61b is substantially the same as the water pressure Pw.

When there is a difference in depth between the open end 27 and the water-pressure-side diaphragm 25b, for instance, this difference is slightly corrected by the measurement unit 61b such that it completely matches the water pressure Pw.

Figure 10B:
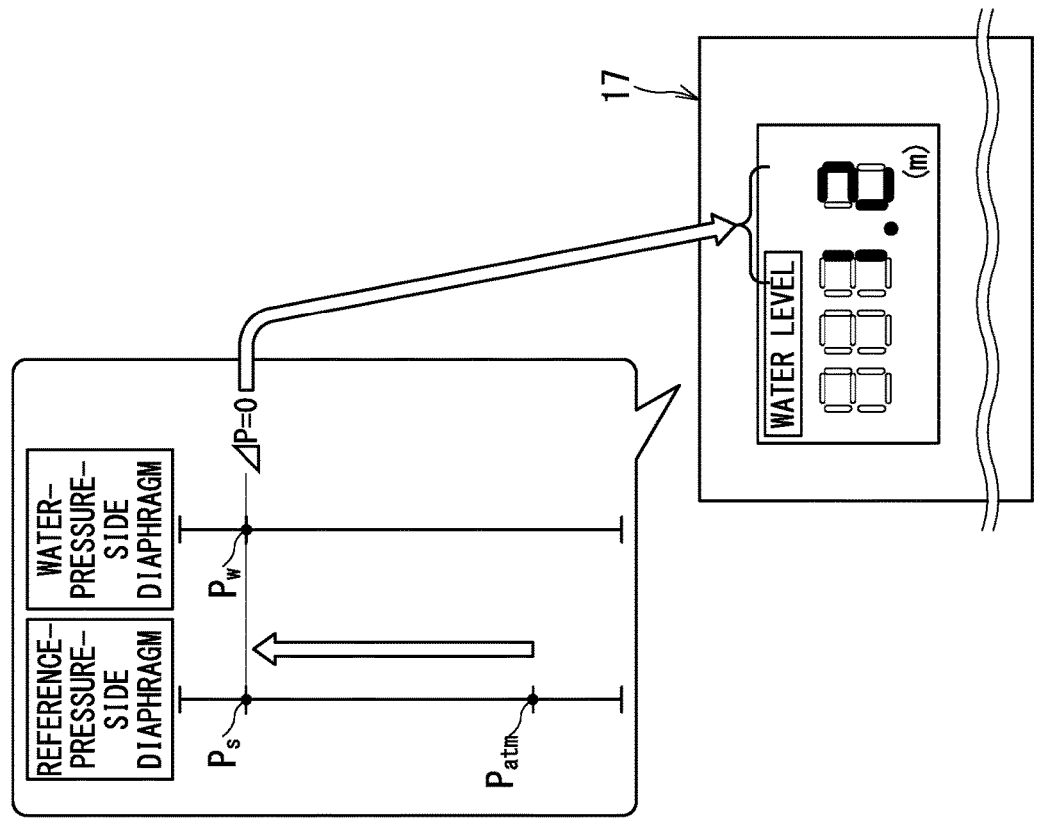
FIG. 10B is a schematic diagram illustrating a calibration method in which the measurement device with a dose calculation function is used.
Figure 10A:
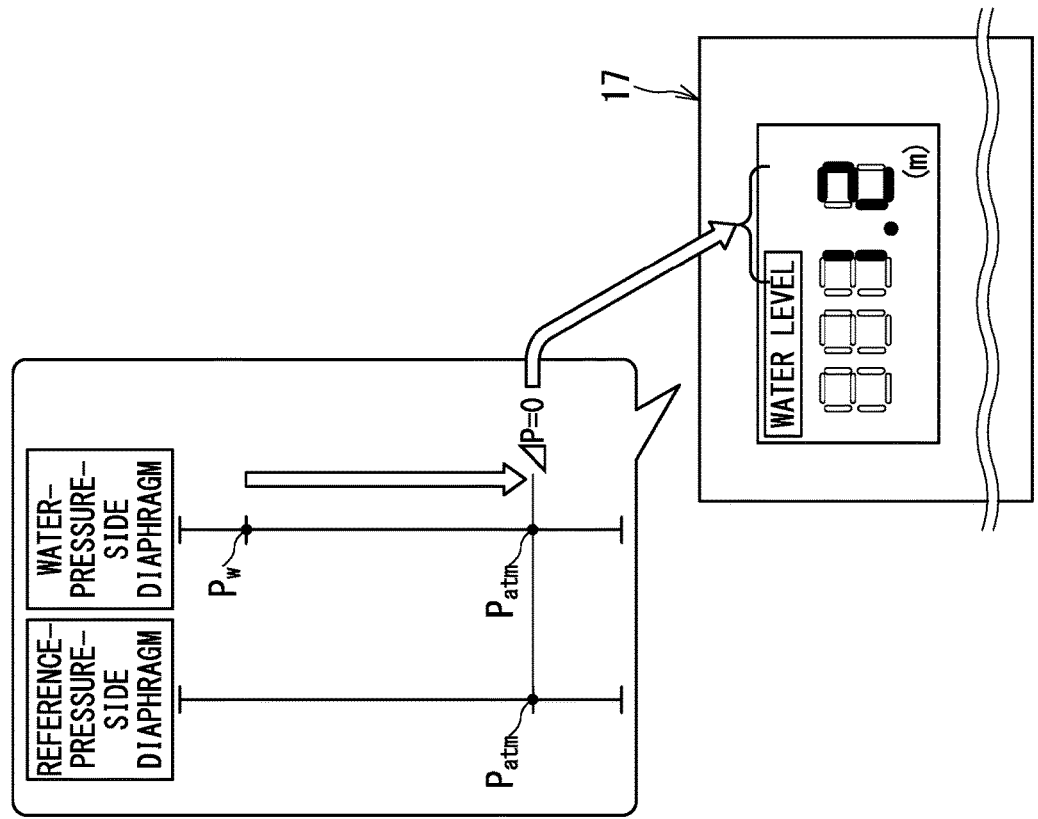
FIG. 10A is a schematic diagram illustrating a calibration method of a conventional immersion-type water gauge.

FIG. 10A is a diagram illustrating a calibration method of a conventional immersion-type water gauge 10A, and FIG. 10(B) is a diagram illustrating the calibration method with the use of the measurement device 90 with a dose calculation function.

Conventionally, in the case of calibrating the indicated value of the water level of the display 17, the detector 20 is once pulled up to the water surface in such a manner that the water pressure $P_w$ applied to the water-pressure-side diaphragm 25b matches the atmospheric pressure $P_{atm}$.

In other words, as shown in FIG. 10A, the water pressure $P_w$ is lowered ($P_w \rightarrow P_{atm}$) by completely pulling up the detector 20 above the water, and then it is checked whether the indicated value indicates the zero point or not.

In the calibration method according to the first embodiment, instead of pulling up the detector 20, the reference pressure is changed by applying the above-described back pressure $P_s$ to the reference-pressure-side diaphragm 25a.

That is, as shown in FIG. 10B, the pressure applied to the reference-pressure-side diaphragm 25a is increased ($P_{atm} \rightarrow P_s$) in such a manner that the pressure of the reference-pressure-side diaphragm 25a matches the water pressure $P_w$.

A calibration unit 12 calibrates the indicated value, in such a manner that the indicated value indicates the zero point when the back pressure Ps is applied to the reference-pressure-side diaphragm 25a.

Additionally, when the span calibration is performed, this back pressure $P_s$ can also be used.

In other words, the span calibration can be performed without pulling up the detector 20, by applying pressure from the application unit 16 such that the pressure difference $\Delta P$ from the back pressure $P_s$ becomes a predetermined value.

Since the third embodiment is the same as the first embodiment in terms of configuration and operation except that calibration is performed by applying pressure to the reference-pressure-side diaphragm 25a on the basis of the pressure measured by the auxiliary measurement unit 61, duplicate description is omitted.

The same reference signs are given for equivalent components in terms of configuration or function in each figure, and duplicate description is omitted.

As described above, by applying pressure to the reference-pressure-side diaphragm 25a on the basis of the back pressure $P_s$ measured by the auxiliary measurement unit 61, the measurement device 90 with a dose calculation function according to the third embodiment can obtain the same effect as the first embodiment and perform calibration without pulling up the detector 20.

According to the calculation device 50 of at least one embodiment described above, radiation dose at a detection point can be determined without adding a new device to the detector 20 that detects a specific physical quantity.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and the spirit of the inventions.

For instance, although a description has been given of only the case where the level of the radioactively contaminated liquid is detected in each embodiment, the targets of the level detection is not limited to the liquid which has radioactivity.

REFERENCE SIGNS LIST 10 measurement device (immersion-type water gauge)
12 calibration unit
13 signal line
14 converter
16 application unit
17 display
18 reinforcing line
19 three-way valve
20 detector
21 housing
22 pressure sensor
23 hollow cable
24 water inlet hole
25 (25a, 25b) diaphragm (reference-pressure-side diaphragm, water-pressure-side diaphragm)
26 difference unit
27 open end
28 V/I conversion element
29 transmission line
50 dose calculation device
51 memory
52 correlation storage
53 first evaluator
54 second evaluator
56 comparator
57 dose calculator (calculator)
58 alerting unit
61 (61a, 61b) auxiliary measurement unit (immersed unit, measurement unit)
61a (61) bubbler tube
90 measurement device with a dose calculation function
$P_{atm}$ atmospheric pressure
$P_s$ back pressure
$P_w$ water pressure
$\Delta P$ pressure difference

The invention claimed is:

1. A dose calculation device equipped in a measurement device that converts a detected physical quantity from voltage into current by a V/I conversion element and transmits the detected physical quantity, the dose calculation device comprising:
   a memory configured to store a zero point current and a shift amount from a true value of an electric current, the zero point current being outputted from the V/I conversion element by being exposed to radiation in a period during which the voltage is not inputted, the electric current being outputted from the V/I conversion element by being exposed to radiation with respect to an inputted known voltage;
   a correlation storage configured to hold zero point shift data and span shift data, the zero point shift data indicating correlation between the zero point current and cumulative radiation dose of the radiation acquired in advance, the span shift data indicating correlation between the cumulative radiation dose and the shift amount;
   a first evaluator configured to estimate at least one cumulative radiation dose of the V/I conversion element based on the zero point current stored in the memory and the zero point shift data;
   a second evaluator configured to estimate at least one cumulative radiation dose of the V/I conversion element based on the shift amount stored in the memory and the span shift data; and
   a comparator configured to specify a common cumulative radiation dose as a true cumulative radiation dose, by comparing respective cumulative radiation doses estimated by the first evaluator and the second evaluator.

2. The dose calculation device according to claim 1, further comprising a calculator configured to calculate radiation dose by dividing the true cumulative radiation dose by a period from detection start.

3. The dose calculation device according to claim 1, wherein the dose calculation device is configured to limit a reference range of the zero point shift data by two or more zero point currents having different recording times.

4. The dose calculation device according to claim 1, wherein the dose calculation device is configured to limit a reference range of the span shift data by two or more shift amounts having different recording times.

5. The dose calculation device according to claim 1, further comprising a alerting unit configured to issue an alert when the true cumulative radiation dose having been specified becomes larger than a predetermined threshold value.

6. A measurement device with a dose calculation function comprising:
   at least one detector configured to detect a specific physical quantity as voltage;
   a V/I conversion element configured to convert the specific physical quantity from the voltage into current;
   a memory configured to store a zero point current and a shift amount from a true value of an electric current, the zero point current being outputted from the V/I conversion element by being exposed to radiation in a period during which the voltage is not inputted, the electric current being outputted from the V/I conversion element by being exposed to radiation with respect to an inputted known voltage;
   a correlation storage configured to hold zero point shift data and span shift data, the zero point shift data indicating correlation between the zero point current and cumulative radiation dose of the radiation acquired in advance, the span shift data indicating correlation between the cumulative radiation dose and the shift amount;
   a first evaluator configured to estimate at least one cumulative radiation dose of the V/I conversion element based on the zero point current stored in the memory and the zero point shift data;
   a second evaluator configured to estimate at least one cumulative radiation dose of the V/I conversion element based on the shift amount stored in the memory and the span shift data; and
   a comparator configured to specify a common cumulative radiation dose as a true cumulative radiation dose, by comparing respective cumulative radiation doses estimated by the first evaluator and the second evaluator.

7. The measurement device with a dose calculation function according to claim 6,
   wherein the at least one detector is a diaphragm-type pressure detector or a spring-type pressure detector.

8. The measurement device with a dose calculation function according to claim 6,
   wherein the at least one detector comprises a plurality of detectors; and
   the plurality of detectors are disposed at respective positions different from each other.

9. The measurement device with a dose calculation function according to claim 6, wherein the measurement device with a dose calculation function is an immersion-type water gauge.

10. The measurement device with a dose calculation function according to claim 6, further comprising a measurement unit and an application unit,
wherein the at least one detector is configured to seal inside of a housing partially opened in liquid by using a pressure sensor, and to detect a pressure difference between a water pressure applied to the pressure sensor from the liquid and an atmospheric pressure applied from the inside by a hollow cable connected to the housing;
the measurement unit is configured to be fixed to outer surface of the at least one detector and measure the water pressure that is applied to the at least one detector; and
the application unit is configured to apply a water pressure measured by the measurement unit from the hollow cable.

11. A dose calculation method in which a measurement device is used for converting a detected physical quantity from voltage into current by a V/I conversion element and transmitting the detected physical quantity, the dose calculation method comprising:

acquiring a zero point current and a shift amount from a true value of an electric current, the zero point current being outputted from the V/I conversion element by being exposed to radiation in a period during which the voltage is not inputted, the electric current being outputted from the V/I conversion element by being exposed to radiation with respect to an inputted known voltage;
referring to zero point shift data and span shift data, the zero point shift data indicating correlation between the zero point current and cumulative radiation dose of the radiation acquired in advance, the span shift data indicating correlation between the cumulative radiation dose and the shift amount;
estimating at least one cumulative radiation dose of the V/I conversion element based on the zero point current and the zero point shift data, as a first estimation step;
estimating at least one cumulative radiation dose of the V/I conversion element based on the shift amount and the span shift data, as a second estimation step; and
determining a common cumulative radiation dose as a true cumulative radiation dose, by comparing respective cumulative radiation doses estimated in the first estimation step and the second estimation step.

* * * * *